(12) United States Patent
Gerphagnon et al.

(10) Patent No.: US 10,318,439 B2
(45) Date of Patent: Jun. 11, 2019

(54) MANAGEMENT OF ACCESS TO DATA IN A STORAGE SYSTEM

(71) Applicant: BULL SAS, Les Clayes-sous-Bois (FR)

(72) Inventors: Jean-Olivier Gerphagnon, Vif (FR); Grégoire Pichon, Poisat (FR); Ludovic Sauge, Grenoble (FR)

(73) Assignee: BUL SAS, Les Clayes-sous-Bois (FR)

( * ) Notice: Subject to any disclaimer, the term of this patent is extended or adjusted under 35 U.S.C. 154(b) by 0 days.

(21) Appl. No.: 15/498,968

(22) Filed: Apr. 27, 2017

(65) Prior Publication Data

US 2017/0315936 A1   Nov. 2, 2017

(30) Foreign Application Priority Data

Apr. 27, 2016   (FR) ...................... 16 53750

(51) Int. Cl.
*G06F 12/00* (2006.01)
*G06F 12/14* (2006.01)
*G06F 3/06* (2006.01)
*G06F 13/38* (2006.01)

(52) U.S. Cl.
CPC ........ *G06F 12/1475* (2013.01); *G06F 3/0604* (2013.01); *G06F 3/065* (2013.01); *G06F 3/0622* (2013.01); *G06F 3/0685* (2013.01); *G06F 13/385* (2013.01); *G06F 2212/1052* (2013.01)

(58) Field of Classification Search
None
See application file for complete search history.

(56) References Cited

U.S. PATENT DOCUMENTS

| 2007/0288691 | A1  | 12/2007 | Couvert et al. |
| 2008/0109450 | A1* | 5/2008  | Clark ................ G06F 17/30067 |
| 2014/0188808 | A1* | 7/2014  | Wolf ................. G06F 17/30289 |
| | | | 707/654 |
| 2015/0126288 | A1  | 5/2015  | Okino |
| 2017/0011054 | A1* | 1/2017  | Chennamsetty .. G06F 17/30132 |

* cited by examiner

*Primary Examiner* — John A Lane
(74) *Attorney, Agent, or Firm* — Pillsbury Winthrop Shaw Pittman LLP

(57) ABSTRACT

For the management of a file system for accessing data in a storage system in which the data are stored physically in a unique manner, a first storage environment associated with a first access performance level is mounted, from a first mount point. Moreover, at least one second storage environment, different from the first storage environment, and associated with a second access performance level is mounted, from a second mount point and with total or partial overlay of data with respect to the first storage environment. The data physically stored in a unique manner in the storage system is accessed, either via the first mount point or via the second mount point, as a function of a data use case.

10 Claims, 3 Drawing Sheets

MANAGEMENT OF ACCESS TO DATA IN A STORAGE SYSTEM

CROSS-REFERENCE TO RELATED APPLICATIONS

This application claims priority to French Patent Application No. 1653750, filed Apr. 27, 2016, the entire content of which is incorporated herein by reference in its entirety.

FIELD

The present invention relates in a general manner to the field of high performance computing (or HPC).

In particular, it pertains to the management of access to data in a storage system, and finds applications, notably, in supercomputers. Supercomputers, also called high performance computers (HPC), are used for example in the field of scientific computing. The invention may also apply to environments of cloud computing type, that is to say in which the elements are remote from each other, potentially on different sites.

BACKGROUND

A supercomputer is a computer designed to attain the highest possible performances with the techniques known at the time of its design, in particular as regards the rapidity of data processing (computing speed). It is also called a high performance computer.

Nowadays, the volume of data processed by computer applications running on this type of computer commonly reaches several hundreds of gigaoctets (Go). It may go up to several teraoctets (To) for certain scientific computing applications (for example the analysis of earthquakes, meteorology, molecular modelling), or for stochastic computation in the field of finance or insurance. It goes without saying that such data volumes cannot be stored permanently in the central memory of the computer, or random access memory (RAM), which is very expensive. In addition, the random access memory is a volatile memory whereas a storage that is persistent in the long term, making it possible to save the data processed or to be processed for future use, is also necessary.

That is why the data are stored in secondary, non-volatile memories in the form of files, that is to say structured sequences of data blocks. The secondary memories are mass storage components, for example hard disc drives (HDD). A data block is the smallest data unit that the storage system is capable of managing. The content of these blocks, simple sequences of binary data, may be interpreted according to the file format as characters, whole or floating-point numbers, machine operating codes, memory addresses, etc.

The secondary memories form a mass storage system (or storage) for the persistent storage of data in the supercomputer. The exchange of data between the central memory and this storage system takes place by transfer of blocks.

The function of a file system (FS) is to ensure access to the contents of the files stored in the storage system in the best conditions of rapidity and reliability. The access to a file located at a given location of the storage system comprises the opening of the file and the carrying out of operations of reading or writing of data in the file. These operations enable, for example, the recording of the file, its copying or its displacement to another location, or its deletion. They are controlled by corresponding instructions of a computer programme when it is executed by one or more processors of the supercomputer. These instructions specify an access path to the file. Such an access path is formed, for example, of a name preceded by a list of interwoven directories (under Windows), or a chained list of files (under UNIX).

The design of a supercomputer should ensure that large volumes of data can be read, transferred and stored rapidly, that is to say with relatively high rates of access to the storage components, of the order of several tens or even several hundreds of gigaoctets per second (Go/s). Yet, the cost of a supercomputer is greatly dependent on the volumetry and the rate offered by the storage system.

It is known that the carrying out of works using the data stored on the storage components of the storage system is sometimes sensitive to the speed of accessing the data, but sometimes much less. This signifies that certain works are relatively little impacted in their run time (which determines the efficiency of the supercomputer), by the access rate offered by the storage system.

For example, the storage of data representing the application (programme and libraries), compilation data, syntheses of results, or certain visualisation results may be satisfied by a relatively slow storage system. On the contrary, intermediate computing data, and output or visualisation data are more sensitive to the efficiency of the storage system.

In order to take account of the aforementioned considerations, HPC type environments are often composed of two or more independent storage sub-systems. On account of the respective technologies of the storage components respectively associated with these storage sub-systems, one of the storage sub-systems is relatively rapid and more or less capacitive, and the other is relatively slow and very capacitive. Put another way, the design of the supercomputer obeys the search for a compromise between the respective volumetries of a first storage system offering a good access rate but which is expensive, and a second storage system which is more capacitive but offering a less good access rate and which is cheaper.

Nevertheless, and even excluding the different access profiles to manage, at the level for example of the inputs/outputs (E/S), the cost associated with the putting in place of these two types of storage components for two unconnected storage systems is not optimal. In fact, the overall volumetry of such a composite storage system is increased compared to that of a standard storage system, that is to say unitary with respect to the technology of storage components and thus to the access performance level (notably in terms of rate and rapidity of access to data).

This solution implies copies of data between the two types of storage components, according to the following outline:
1. Preparation of data sets on the first level storage system (that which is relatively the slowest);
2. Copying data from the first level storage to the second level (that which is relatively the fastest);
3. Carrying out of works on the data present on the second level storage system; and, as an option,
4. Recopying data to the first level storage system.

Consequently, many data exchanges are necessary between the different storage sub-systems, which implies an additional cost also in time and in additional operations.

SUMMARY

An aspect of the invention aims to eliminate, or at least to mitigate, all or part of the aforementioned drawbacks of the prior art.

To this end, a first aspect of the invention proposes a method for managing a file system for accessing data in a storage system in which the data are stored physically in a unique manner. The method comprises:

- the mounting, from a first mount point, of a first storage environment associated with a first set of access parameters, for accessing all or part of the data stored physically in a unique manner in the storage system, with an access performance level determined by the first set of parameters;
- the mounting, from a second mount point and with total or partial overlay of data with respect to the first storage environment, of at least one second storage environment, different from the first storage environment, and associated with a second set of access parameters, different from the first set of access parameters, for accessing all or part of the data stored physically in a unique manner in the storage system, with an access performance level determined by the second set of access parameters; and,
- the access by the user to the data physically stored in a unique manner in the storage system, either via the first mount point or via the second mount point, as a function of a data use case.

Aspects of the invention make it possible to offer a tight management of access performances associated with a data set present in a unique manner on a same storage system, as a function of its use. This avoids the recopying of data between different storage systems or sub-systems, while offering the same performances compared to solutions of the prior ar.

According to one or more embodiments, taken in isolation or in combination:

- the first storage environment and the second storage environment may both be virtual environments directed towards a third storage environment for enabling access to the data of the third storage environment with an access performance level determined by the first set of access parameters or by the second set of access parameters, respectively;
- the third storage environment may be associated with a third set of access parameters, different from the first set of access parameters and from the second set of access parameters; and/or,
- the third set of access parameters may define an access performance level specific to an administrator, which access performance level is not accessible to a user who is not an administrator.

In an alternative embodiment, the first storage environment may be a reference storage environment and the second storage environment may be a virtual storage environment directed towards the first storage environment to enable access to the data of the first storage environment with an access performance level determined by the second set of access parameters.

In an embodiment, the second storage environment has an attribute indicating that it is a virtual storage environment and has an access performance level different from that of the reference storage environment towards which it is directed.

In the examples of use of the method, the file system may be a GPFS system, and the first storage environment and the second storage environment may be GPFS filesets.

The invention is compatible with applications in which the file system is a distributed file system. It may nonetheless be implemented in a parallel file system, or a distributed and parallel file system (that is to say at the intersection of the field of distributed systems and the field of parallel architectures), or quite simply in a network file system.

A second aspect of the invention relates to a computer programme product embedded on a non-transitory computer readable medium and comprising instructions for the implementation of a method according to the above first aspect of the invention, when the programme is run by at least one processor. This computer programme product may notably be run by a processing system configured to manage a file system for accessing data in a storage system within a high performance so computer (HPC).

A third aspect of the invention relates to a data processing system, in the form for example of a supercomputer, comprising technical equipment of hardware and software type for the implementation of the method according to the above first aspect of the invention. Such a data processing system may be a high performance computer (HPC) comprising a set of service nodes having resources of different types each capable of carrying out at least one operation, a storage system in which data are stored physically in a unique manner, and processing resources capable of managing a file system for accessing the data in the storage system according to the method according to the first aspect, for example under the control of a computer programme product according to the second aspect.

The computer programme and the system have at least the same benefits as those procured by the method according to the first aspect of the invention.

BRIEF DESCRIPTION OF THE DRAWINGS

Other characteristics and benefits of aspects of the invention will become clearer on reading the description that follows. The description is purely illustrative and should be read with regard to the appended drawings in which.

DETAILED DESCRIPTION

It will be appreciated by one skilled in the art that the disclosed method and system described herein represent a solution to the technological problem described above currently faced by designers.

In computing, a supercomputer is a high performance computer (HPC) that comprises a set of computing resources, i.e. hardware (e.g. one or more hardware components) or non-hardware resources, which enable the execution of computing tasks or the storage of digital data.

The hardware resources comprise for example, and in a non-limiting manner: rapid electronic components (for example multi-core processors or latest generation graphics cards dedicated to scientific computing), random access memory, and mass storage equipment or secondary memories, in particular hard disc drives in large quantity.

All of these items of equipment are associated with a dedicated operating system (OS), such as for example Windows, or more frequently UNIX or one of its derivatives such as Linux. An application programme (software) runs on this OS, which is designed to ensure the overall management of the hardware resources by benefiting from their potentialities in terms of performance. This is obtained, notably, by exploiting the parallelism and by making transparent the distribution of the hardware resources.

Non-hardware resources may be of any type from the moment that they involve configurable services which are useful to the HPC or to an application running on this computer. Thus, it may for example be a service (NFS or postgresql, for example), or a file system shared between nodes on a storage rack, or an IP (Internet Protocol) address.

From a functional viewpoint, a HPC is a machine that incorporates the above resources to form a computing cluster.

Figure 1:
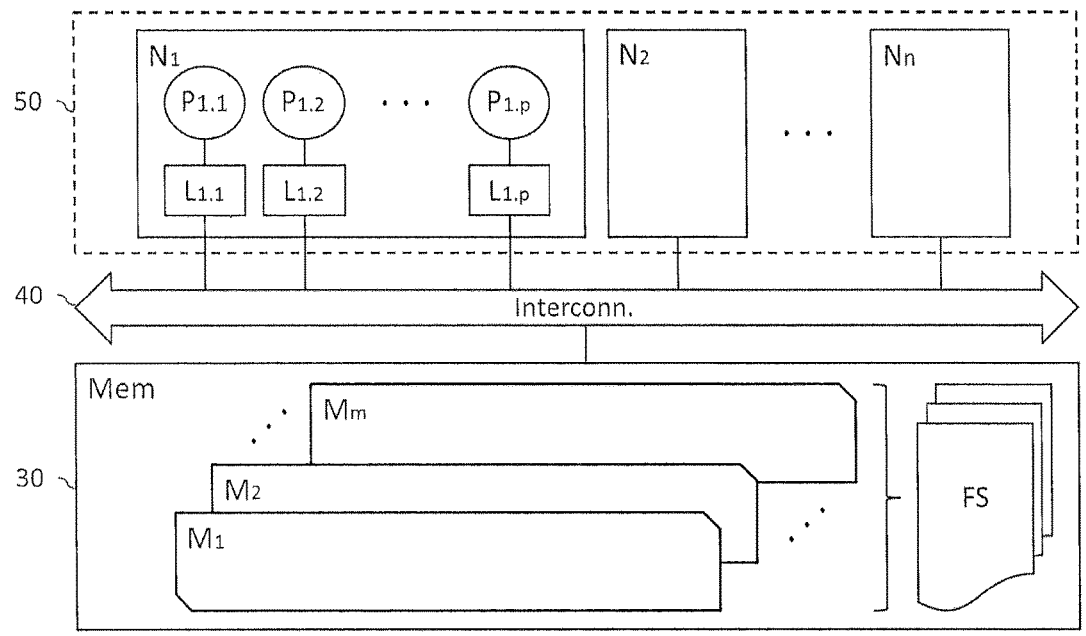
FIG. 1 is a highly simplified functional diagram of a high performance computer (HPC) or supercomputer according to an embodiment of the invention.

With reference to the functional diagram of FIG. 1, an example of HPC comprises a set 50 of n service nodes, N1, N2, ... Nn, respectively, for example computing nodes, a data storage system 30, and an interconnection system 40.

Each of the computing nodes N1, N2, ... Nn of the set 50 comprises one or more processors (e.g. physical processor(s)), input/output peripherals (E/S), and the memory. Such a computing node is for example a so-called monoprocessor computer (PC), a work station, an SMP (Symmetric shared memory Multi-Processor), etc.

A computing node comprises a plurality of processor cores in one or more mono-core or multi-core processors, with the associated physical memory. More particularly, each of the processors comprises a core or a plurality of cores with several Go of cache memory per core.

Thus, in the example represented in FIG. 1, for example, the first node N1 comprises a number p of cores P1.1, P1.2, ... P1.p, respectively, with which are associated cache memories L1.1, L1.2, ... L1.p, respectively. In the language of those skilled in the art, a core is a computational unit (with at least one arithmetic and logic unit or ALU, and registers that store the operands and intermediate computing results), and a processor is formed of a core with the associated cache memory.

The cache memory (for example static memory SRAM) comprises several Ko of cache memory L1, of which in general one half for data and another half for instructions. The cache memory also comprises one cache L2 per core, for example of several hundreds of Ko or of several Mo, and a cache L3 (LLC, or Last Level Cache), for example of several tens or hundreds of Mo, shared between the cores of a processor.

Each node is synchronised by a clock, for example, at 2.7 GHz. Most computing nodes do not have an internal disc, although certain nodes can have one or more internal discs for works requiring the writing of voluminous temporary files. That is why the system is loaded in central memory (for example the dynamic memory DRAM) during the booting of the machine.

The computing nodes are interconnected together and with the data storage system 30 by the interconnection system 40. This may be an input/output bus (E/S) or an interconnection network with high rate and with low latency. Such a network is for example InfiniBand, OmniPath, etc.

The interconnection system 40 is characterised by:
 its pass band in uni- or bi-directional mode, that is to say the data transfer rate (expressed for example in Go/s);
 its latency, that is to say the data transmission time (expressed for example in µs); and,
 its topology, that is to say the type of directory structure of the network between the nodes or the racks.

The rate of the interconnection system 40 is for example of the order of several tens or hundreds of Go/s. The latency is for example of several microseconds (µs). The topology of the interconnection network may be in star or fat tree form, for example with one, two or three "stages" or switch levels. Other examples of topology are 3D tore, hypercube, etc.

This interconnection network is used for MPI (Message Passing Interface) inter-node communications and inputs/outputs (E/S) from and to the file system FS.

The data storage system 30 comprises for example a number m of data storage discs M1, M2, ... Mm, such as hard disc drives (HDD). These discs constitute the physical memory of the HPC for the storage of processed data, and the results of computations. The management of resources which are shared by the nodes is ensured by software, namely the aforementioned application programme, via scripts comprising targets or operations (one script per type of resource).

In, or at least for the storage system 30, this application programme creates a file system FS, for example GPFS in embodiments of the invention, enabling access to the data in the discs via at least one mount point. In computing, a mount point is a directory or a file from which are accessible data existing in the form of a file system on a partition of a hard disc drive or a peripheral.

It will be appreciated that the file system FS enables the storage of information on separate physical equipment, namely the hard disc drives M1, M2, ... Mm constituting the hardware resources of the storage system 30 of FIG. 1. In this way, from the viewpoint of the user, everything happens as if the data was stored on a single support. The user here means the aforementioned application programme that runs on the supercomputer.

It is a manner of storing the information and organising it in files on the memories M1, M2, ... Mm of the data storage system 30. Such a management of files makes it possible to process, to conserve important quantities of data as well as to share the data between several computer programmes. It offers the user an abstract view of his data and makes it possible to locate the data from an access path. Other ways of organising the data exist, for example data bases (notably relational data bases) and indexed files.

From a hardware viewpoint, the HPC machine may be divided into a plurality of racks. The totality or the majority of the racks are computing racks or data storage racks. In the language of those skilled in the art, a computing rack commonly designates a set of nodes connected by an interconnection network, for example the set of nodes 41 connected via the interconnection system 40 of FIG. 1. One or more data storage racks also comprise the m data storage discs M1, M2, ... Mm constituting the storage system 30 and on which is mounted the file system FS.

Embodiments of the invention are based on the concept of "filesets". These filesets are present, for example, on the high performance parallel file system of IBM called GPFS. They make it possible to have two levels of splitting the physical storage capacity by the file system, rather than a single level of splitting by the file system as is commonly done. The idea behind this concept is to have, on a same file system, the equivalent of separate files or directories that are treated as different file systems from the viewpoint of performances for accessing the physical memory. In fact, each fileset may have access parameters that are specific to it. These access parameters comprise notably the quotas, the number E/S per second, the backup configuration, the replication properties, etc.

The above access parameters define for each of the filesets a respective access performance level, which is designated "QoS" (Quality Of Service) within the scope of the present description, because it refers to a set of parameters characterising the overall performance of the access to data: effective transfer rate on a network, number of E/S per second, etc.

These filesets are already used, for example in GPFS, in order to overcome the drawbacks resulting from the fact that the physical storage components are preferably all of a same and unique technology, in order to homogenise the storage capacity. The consequence of this homogeneity is that all the physical storage components have identical characteristics determined by the technology. The filesets thus enable the user to create, on a single and same physical storage, at least two different filesets each with associated "performances", in terms of access to data, which may vary from one fileset to the next.

Figure 2:
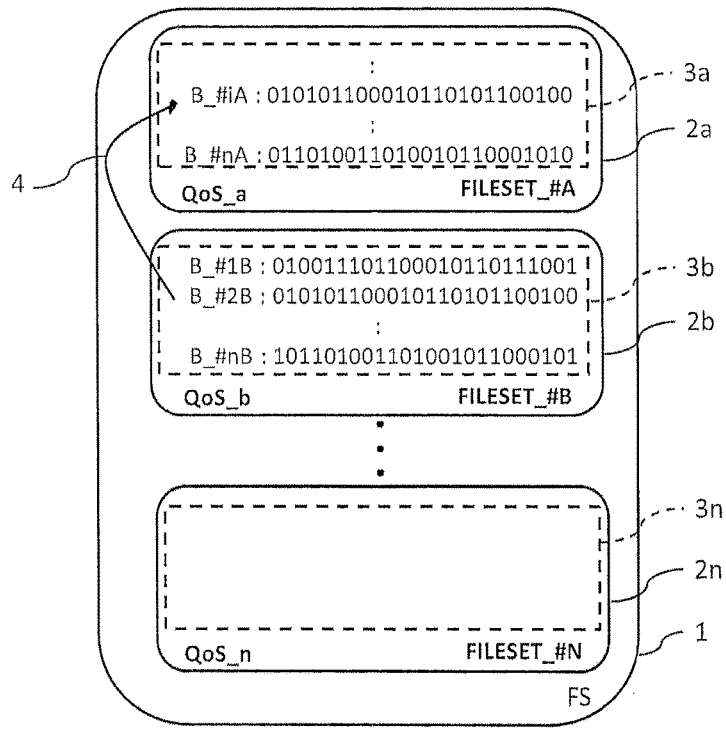
FIG. 2 is a block diagram of a file system of the parallel file system and high performance type of IBM known by the acronym GPFS (General Parallel File System), illustrating the principle of filesets known in this type of file system.

This makes it possible to propose configurations as illustrated schematically in FIG. 2.

With reference to this figure, different filesets 2a, 2b, . . . 2n are mounted within a file system 1, which enable access to the data in the memory zones 3a, 3b, . . . 3n, respectively, of a physical storage system of the high performance computer. In FIG. 2, these separate memory zones 3a, 3b, . . . 3n are represented by boxes in dotted lines. As may be seen, a respective part 3a, 3b, . . . 3n of the memory offered on the whole by the storage system, is thus attributed to each of the filesets 2a, 2b, . . . 2n, respectively. This is more particularly symbolised by the fact that the boxes in dotted lines representing the respective parts 3a, 3b, . . . 3n of the memory are not connected together.

In the memory spaces 3a, 3b, . . . 3n of the storage support, the data are stored in the form of data blocks of same size. For example, for the fileset 2b, a number nB of data blocks B_#1B, B_#2B, . . . B#nB, respectively, may be stored in the memory space 3b. It will be appreciated that the memory capacity of each fileset, expressed as the number of data blocks that can be accessed via the mount point of the fileset, may vary from one fileset to the next.

Each fileset 2a, 2b, . . . 2n, enables access to the data of its associated memory space 3a, 3b, . . . 3n, respectively, with a level of performance (QoS) noted QoS_a, QoS_b, . . . QoS-n, respectively, in FIG. 2. For example, the fileset 2a may offer a rate of 198 Gb/s whereas the fileset 2b may only offer a lower rate of 2 Gb/s. It is then said that the first is relatively rapid whereas the second is relatively slow. It will be noted that two filesets may have a certain identical access parameter, for example the rate, but differ by another parameter, for example the quotas, the backup configuration, the replication properties, etc.

According to the use case of data stored in the storage support of the computer, the application programme may be designed to transfer beforehand the data to process, from a first fileset into a second fileset. This is done in order to be able to take advantage, for the processing to be carried out next, of the best access performance of the second fileset with respect to the first fileset. Still according to the use case, this data transfer may be a displacement (i.e., with deletion of the data of the starting fileset once the data has been written in the destination fileset) or a copy (i.e., writing of data in the destination fileset without deletion of data in the starting fileset).

In the example represented in FIG. 2, data stored in the fileset 2b (relatively slow) which comprises the data block B_#2B are thereby transferred into the fileset 2a (relatively rapid), in order to be used therein for a task in the course of preparation and of which the later execution will require rapid access to the storage support. This transfer is illustrated in FIG. 2 by the arrow 4 as regards the data block B_#2B of the memory zone 3b associated with the fileset 2b, which is written in the block B_#iA of the memory zone 3a associated with the fileset 2a. It will be appreciated that if the data use case calls on a processing for which it is a parameter other than the access rate which is preponderant, the data in question may have to be transferred into the memory zone associated with another fileset, of which the level of performance for this parameter is better.

In other words, and returning to the example described above, the mounting of different filesets with respective associated access performance levels enables better execution of certain tasks in the supercomputer. Nonetheless, a recopying of data in the memory space associated with the rapid fileset is done in order to be able to benefit from the performance of this rapid fileset in terms of access rapidity.

It follows that the same data, i.e. the same data blocks, are generally duplicated in the storage system: they are stored in different memory zones associated with different filesets, respectively. And they are accessed via the mount point of one or the other of these filesets as a function of the use case which determines the level of QoS required to access these data.

The configuration of the file system is thus better from the viewpoint of the unity of the storage system at the physical level, because it is possible to have a single type of memory technology and to have nonetheless different access performances which are attributed on account of the splitting of the file system into different filesets. But this benefit is obtained at the price of a higher required memory capacity, because the data have to be recopied in the environment memory the most suited to each use case. In such a scenario, the data has to be physically displaced between the two filesets (i.e., copied into the destination environment then potentially deleted from the starting environment) because they are considered as being independent environments, each with their own data. This implies an overall consumption of the storage capacity which is greater, and additional data transfer operations which are costly in time and in energy.

That is why the notion of fileset, as such, is insufficient to resolve the problem described in the introduction of the present description.

Embodiments of the invention, on the contrary, make it possible to no longer need to transfer data between different storage environments and even so be able to benefit from a specific level of performance according to the use case of the data.

The proposed solution, in accordance with one or more embodiments, is based on a principle for managing files that are found for example on Unix systems with the notion of links between files (or directories) of a file system.

Under Unix, a link makes it possible, from different "names", to access the same data, that is to say the data stored in a same and unique location in the physical storage. For example, the script below defines two files linked together:

```
$ echo toto >> / tmp/myfile
$ cat /tmp/myfile
toto
$ ln -s /tmp/myfile /tmp/myothernameoffile
$ cat /tmp/myothernameoffile
toto
```

In the above example, the user creates two files, namely a first file called "myfile" and a second file called "myothernameoffile" which is linked to the first. Nevertheless, there only exists a single file on the physical storage, the second file only being a virtual link directed towards the same data as the first file. The link is so-called "virtual" in the sense that relations between the files do not exist at the hardware level, and only exist uniquely from a logical viewpoint.

It will be noted that this principle of links only exists currently in the context of a single and same file system. As such, it does not make it possible to manage access performance differences according to the respective names of files among a plurality of files, or according to the place where the files are located. It is just another name for the same file (or directory).

That is why the notion of link between files (or directories), per se, is also insufficient for resolving the problem described in the introduction of the present description.

The principle of an aspect of the invention is however based on the extension of the notion of virtual link to storage environments having specific characteristics for accessing the memory such as, notably but not uniquely, filesets.

Figure 3A:
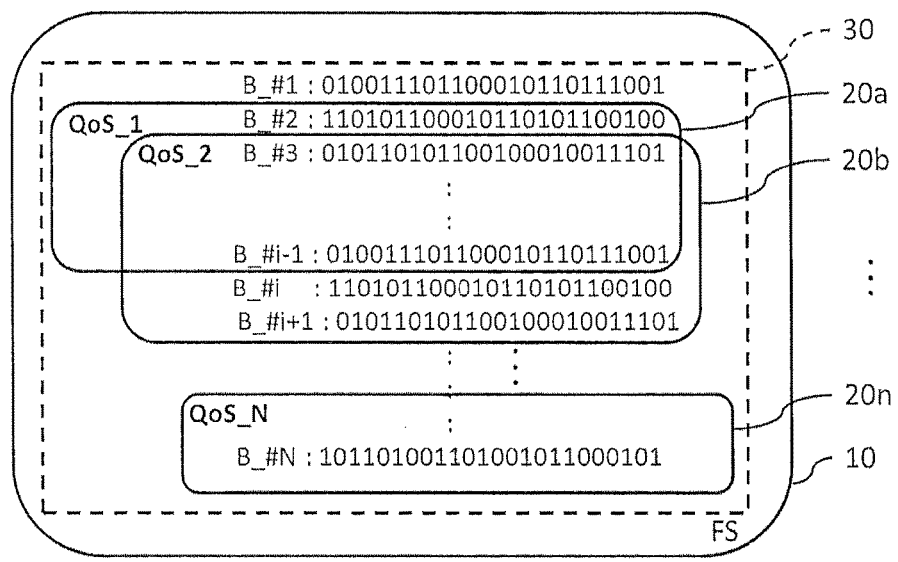
FIGS. 3A-C are a block diagram of a file system in accordance with one or more embodiments of the present invention; and, FIG. 4 is a diagram of steps illustrating a method according to one or more embodiments of the invention.

This principle will firstly be described in a general manner with reference to the simplified diagram of FIG. 3A.

More particularly, it is proposed to manage a file system 10 for accessing the data in a storage system 30 in which the data are stored physically in a unique manner. The uniqueness of the storage of data in the storage system 30 is symbolised, in FIG. 3A, by a single box in dotted lines. The storage system 30 may store a number N of data blocks, respectively noted B_#1, . . . B_#i, . . . B_#N in FIG. 3A.

For accessing the data in the storage system 10, nevertheless, a file system is mounted with at least two separate mount points, and more generally a number n of mount points, associated with n storage environments 20a, 20b, . . . 20n, respectively.

Thus, more particularly, the first storage environment 20a is mounted from a first mount point, while being associated with a first set of access parameters for accessing at least one first part of the data stored physically in the storage system 30. Access to the data via this first mount point thus takes place with an access performance level QoS_1 determined by the first set of access parameters.

From another mount point is moreover mounted the second storage environment 20b, which is associated with another set of access parameters, to access a second part at least of the data stored physically in the storage system 30. There may be total or partial overlay of this second part of data with the first part of data which are accessible through the first storage environment 20a. Access to the data via this other mount point takes place however with an access performance level QoS_2 associated with the storage environment 20b, which is different from the performance level QoS_1, and which is determined by the above other set of access parameters.

Access by the user to data which are common to both environments 20a and 20b but are physically stored in a unique manner in the storage system 30, may then take place either via the mount point of the environment 20a, or via the mount point of the environment 20b, as a function of the data use case. The choice of the mount point used for accessing the data is conditioned by the access performance level required for the planned usage of the data.

It will be noted that the volume of data (expressed in number of data blocks) accessible via each storage environment of the file system 20a, . . . 20n may vary from one environment to the next. In addition, one or more environments may enable access to the whole of the N blocks B_#1 to B_#N of the storage system 30. Also, one at least of the storage environments, such as the environment 20n represented in FIG. 3A, may be the single and unique storage environment of the file system to enable access to certain determined data blocks.

Figure 3B:
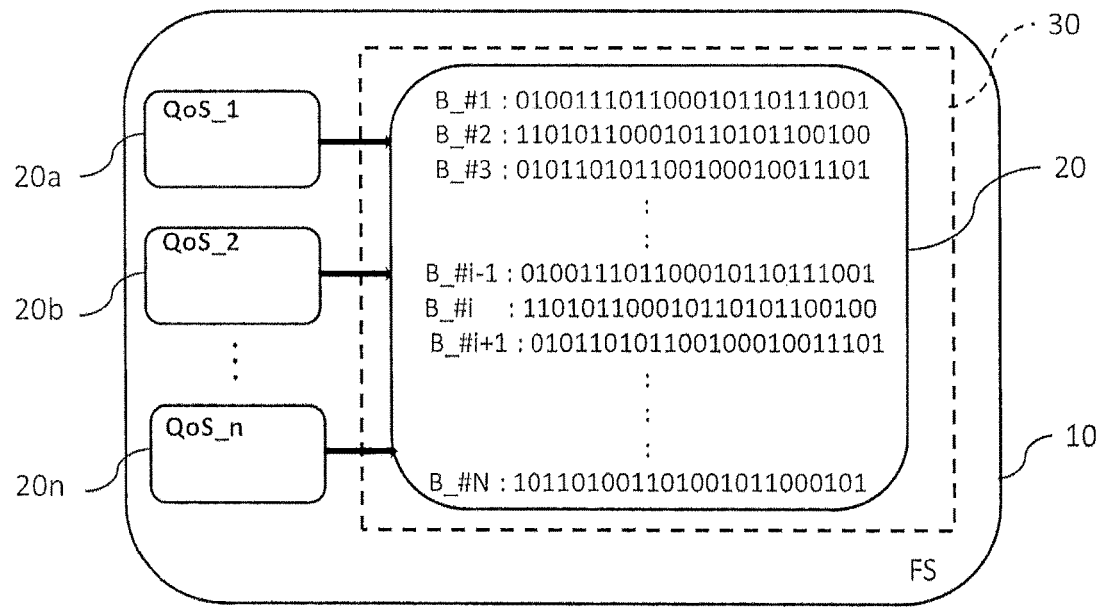

In an example illustrated by the simplified diagram of FIG. 3B, the storage environments 20a, 20b, . . . 20n are virtual environments directed towards another storage environment 20 to enable access to the data of the other storage environment 20 with a specific access performance level QoS_1, QoS_2, . . . , QoS_n, respectively.

An embodiment in accordance with this example may comprise the creation of two filesets each associated with respective access performances, and which are both linked to a same and unique third fileset, which enables actual access to the data. For example, under Unix, it is thus possible to have:

a first relatively slow fileset /home, which is associated with an access performance level QoS-Slow comprising an access rate of, for example, 2 Go/s;

a second relatively rapid fileset /scratch, which is associated with an access performance level QoS-Fast comprising an access rate of, for example, 198 Go/s; and, the filesets /home and /scratch are both linked to a third fileset /real, which may for example be associated with an access performance level specific to administrators and non-accessible to users.

For example, the command mmlinkfileset makes it possible to create a link (i.e., a junction) which references the root directory of a file system of GPFS type. Its operating syntax is the following:

mmlinkfileset Device FilesetName [-J JunctionPath]

In the embodiments, the fileset /home and the fileset /scratch may thus be linked to the fileset /real which gives, during the edition of a listing of three filesets, the same information content (i.e., the same data blocks) stored in the same physical location:

---

$ ls /real
Permission denied
$ su –
$ ls /real
fileA
fileB
fileC
$ filefrag -v /real/fileA
File size of /real/fileA 285212672 (278528 blocks of 1024 bytes)
ext: device_logical: physical_offset: length: dev: flags:
0:       0.. 122879: 4679680..4802559: 122880: 0002: network
1: 122880.. 245759: 4817920..4940799: 122880: 0002: network
2: 245760.. 278527: 4948992..4981759: 32768: 0002: network
$ ls /home
fileA
fileB
fileC
$ filefrag -v /home/fileA
File size of /home/fileA 285212672 (278528 blocks of 1024 bytes)
ext: device_logical: physical_offset: length: dev: flags:
0:       0.. 122879: 4679680..4802559: 122880: 0002: network
1: 122880.. 245759: 4817920..4940799: 122880: 0002: network
2: 245760.. 278527: 4948992..4981759: 32768: 0002: network
$ ls /real
fileA
fileB fileC
$ filefrag -v /scratch/fileA
File size of /scratch/fileA 285212672 (278528 blocks of 1024 bytes)
ext: device logical: physical_offset: length: dev: flags:
0:       0.. 122879: 4679680..4802559: 122880: 0002: network
1: 122880.. 245759: 4817920..4940799: 122880: 0002: network
2: 245760.. 278527: 4948992..4981759: 32768: 0002: network

---

It will be noted nevertheless that the data are only physically present at the physical level in the storage space associated with the fileset /real. Furthermore, there is no physical storage space associated with the filesets /home and /scratch. The filesets /home and /scratch are only virtual links directed towards the data of the fileset /real.

When access takes place via the mount point of the file /home, the maximum performance is restricted by the performance level QoS-Slow. Corresponding use cases are for example preparation before the submission of works, compilation, etc. On the other hand, if access to the same data (i.e., to the data stored in the same location in the physical storage) takes place via the file /scratch, then the maximum performance is restricted by the performance level QoS-Fast.

Figure 3C:
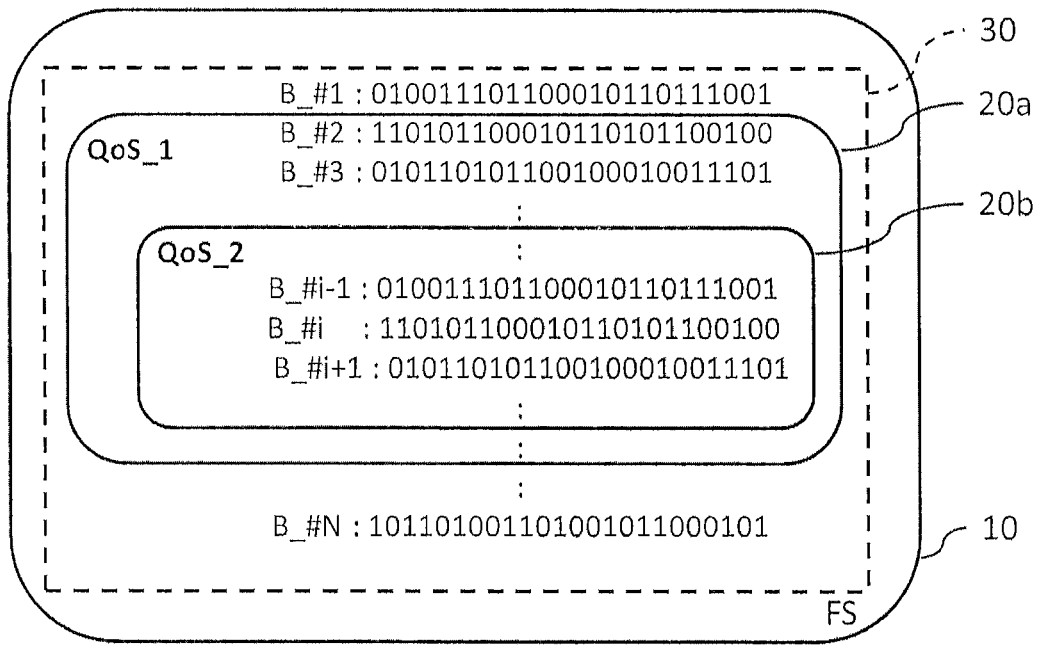

In a second embodiment illustrated by the simplified diagram of FIG. 3C, the second storage environment $20b$ may be a virtual environment directed towards the first storage environment $20a$, to enable access to the data of the first storage environment $20a$ with an access performance level QoS_2 determined by the second set of access parameters, different from the level QoS_1 associated with the environment $20a$.

One exemplary embodiment may consist in defining, in a specific attribute of the filesets, that a determined fileset may only be a "virtual" replica (i.e., a virtual replication) of another fileset. This attribute makes it possible to mount a virtual fileset directed towards a reference fileset while indicating that the fileset thereby mounted is not a real storage environment but is uniquely a director to another fileset which is alone associated with a storage environment really storing the data, but while indicating that it has an access performance level different from that of the reference fileset. In other words, the fileset thereby mounted may be a "daughter" fileset which inherits from its "parent" fileset access rights enabling it to access all or part of the data accessible by the parent fileset, but without benefiting from the same access performance level as that which this parent fileset has.

In the example represented in FIG. 3C, the data blocks accessible via the environment $20b$ are all comprised in the data accessible via the environment $20a$.

The solution according to the embodiments given above makes it possible to access data according to different levels of QoS while avoiding the replication of data (and thus data movements). The increase in the storage capacity desired for managing the duplication of data induced by solutions of the prior art is dispensed with.

Figure 4:
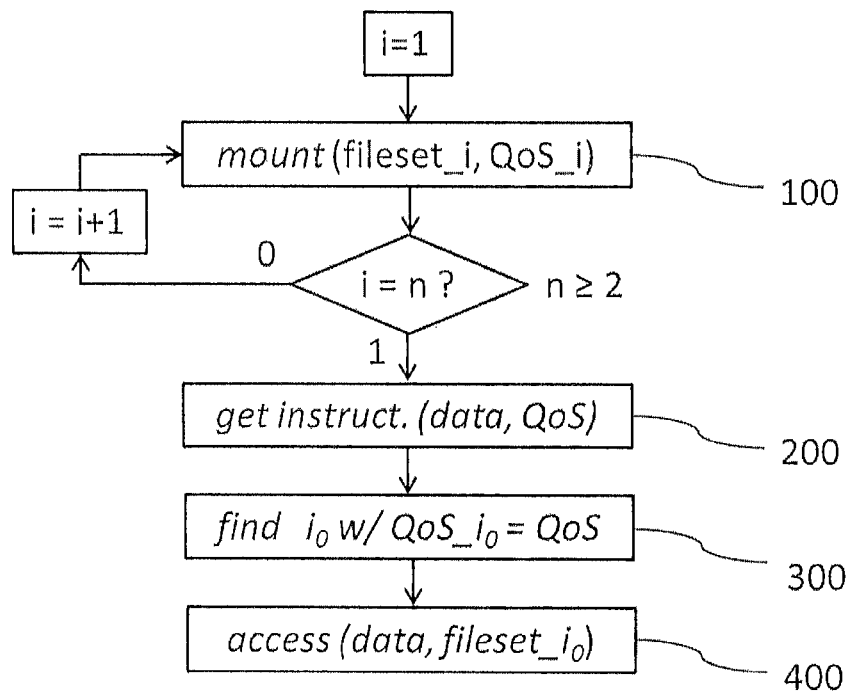

FIG. 4 is a diagram of steps illustrating the main steps of a method for managing a file system for accessing data in a storage system in which the data are stored physically in a unique manner, such as the storage system 30 of FIGS. 3A-3C.

The mounting 100 is firstly carried out, from a first mount point, of a first storage environment such as for example a fileset fileset_1 with all or part of the data stored physically in a unique manner in the storage system, with an access performance level QoS_1. This level QoS_1 is determined by a first set of access parameters for accessing the data via the storage environment fileset_1.

Step 100 is repeated an n number of times, where n is a whole number greater than or equal to 2 (n≥2). Notably, the mounting is carried out, from a second mount point, of at least one second storage environment such as a fileset fileset_2, different from the fileset fileset_1. This second storage environment is associated with a second set of access parameters, different from the first set of access parameters, for accessing all or part of the data stored physically in the storage system, with an access performance level QoS_2 determined by the second set of access parameters. There may be total or partial overlay of data accessible via the second storage environment fileset_2, with the data accessible by the first storage environment fileset_1. In practice, the number n depends on the specificities of the application, i.e. n is the number of data use profiles which call on a specific level of performance of accessing data.

In 200, the scheduler charged with preparing the operations necessary for the execution of instructions comprised in the user programme before their actual execution by one (or more) processor(s), receives an instruction involving the access to data in the storage system with a determined access performance level QoS.

In 300, the scheduler identifies the access environment that is appropriate for accessing the data in the secondary memories of the storage system, as a function of a data use case, on the basis of the required access performance level QoS. This consists in the example above, in selecting one of the filesets fileset_1 and fileset_2, and more generally in determining the fileset fileset_$i_0$ of which the performance level QoS_$i_0$ is equal to the required performance level QoS.

In 400, the necessary data are accessed, which are physically stored in a unique manner in the storage system, either via the mount point of the fileset fileset_1 or via the mount point of the fileset fileset_2, and more generally via the mount point of the fileset fileset_$i_0$ that has been selected in 300.

To summarise, the proposed solution makes it possible to manage virtual links between the contents of different storage environment of a file system, such as for example filesets of the GPFS system of IBM, for defining different properties such as access performances, for example, depending on the fileset used for accessing the data. This functionality makes it possible to reduce the volumetry (and thus the cost) of storage supports.

The present invention has been described and illustrated in the present detailed description and in the figures in relation with conceivable or envisaged embodiments. The present invention is not limited, however, to the embodiments described. Other alternative embodiments and embodiments may be deduced and implemented by those skilled in the art on reading the present description and the appended drawings.

Notably, there is no impediment to using the teaching of the present invention in the context of a distributed file system making it possible to access data stored physically on a computer cluster, rather than in the context of a supercomputer. A computer cluster is a system grouping together several independent computers called nodes, in order to enable an overall management making it possible to go beyond the limitations of a single computer. This makes it possible, notably, to increase availability, to facilitate ramp up, to enable distribution of the load, and to facilitate the management of resources (processor, random access memory, hard disc drives, network pass band).

Moreover, although the notion of fileset that exists in the GPFS has been used as the basis for the above description of embodiments, the teaching of the invention applies just as well to any type of storage environment, as a function of the specificities of the application and notably as a function of the operating system. For example, under Windows, the storage environments are directories. Those skilled in the art will know how to allocate to such a directory parameters or properties defining a specific performance level of access to the data of the directory. This result may for example be obtained thanks to a notion of attribute of the directory, as in the second embodiment described above.

In the claims, the term "comprises" does not exclude other elements or other steps. A single processor or several other units may be used to implement the invention. The different characteristics described and/or claimed may be advantageously combined. Their presence in the description or in the different dependent claims does not exclude this possibility. The reference signs cannot be understood as limiting the scope of the invention.

The invention claimed is:

1. A method for managing a file system for accessing data in a storage system in which the data are stored physically in a unique manner, the method comprising:
    mounting, from a first mount point, of a first storage environment associated with a first set of access parameters, for accessing all or part of the data stored physically in a unique manner in the storage system, with an access performance level determined by said first set of access parameters;
    mounting, from a second mount point and with total or partial overlay of data with respect to the first storage environment, of at least one second storage environment, different from the first storage environment, and associated with a second set of access parameters, different from the first set of access parameters, for accessing all or part of the data stored physically in a unique manner in the storage system, with an access performance level determined by said second set of access parameters; and,
    selecting the first mount point or the second mount point via which a user accesses the data physically stored in a unique manner in the storage system based on a data use case.

2. The method according to claim 1, wherein the first storage environment and the second storage environment are both virtual environments directed towards a third storage environment to enable access to the data of said third storage environment with an access performance level determined by the first set of access parameters or by the second set of access parameters, respectively.

3. The method according to claim 2, wherein the third storage environment is associated with a third set of access parameters, different from the first set of access parameters and from the second set of access parameters.

4. The method according to claim 3, wherein the third set of access parameters defines an access performance level specific to an administrator, which access performance level is not accessible to a user who is not an administrator.

5. The method according to claim 1, wherein the first storage environment is a reference storage environment and the second storage environment is a virtual storage environment directed towards the first storage environment to enable access to the data of said first storage environment with an access performance level determined by the second set of access parameters.

6. The method according to claim 5, wherein the second storage environment has an attribute indicating that it is a virtual storage environment and has an access performance level different from that of the reference storage environment towards which it is directed.

7. The method according to claim 1, wherein the file system is a Unix system, and wherein the first storage environment and the second storage environment are Unix file sets.

8. The method according to claim 1, wherein the file system is a distributed file system.

9. A non-transitory computer readable medium comprising a computer programme product comprising a set of instructions which, when it is executed by a processor, is suitable for implementing the method according to claim 1 for managing a file system for accessing data in a storage system within a high performance computer.

10. A high performance computer comprising a set of service nodes having resources of different types each configured to carry out at least one operation, a storage system in which data are stored physically in a unique manner, and a processing system configured to manage a file system for accessing data in said storage system according to the method of claim 1.

\* \* \* \* \*

UNITED STATES PATENT AND TRADEMARK OFFICE
CERTIFICATE OF CORRECTION

PATENT NO.        : 10,318,439 B2
APPLICATION NO.   : 15/498968
DATED             : June 11, 2019
INVENTOR(S)       : Jean-Olivier Gerphagnon et al.

Page 1 of 1

It is certified that error appears in the above-identified patent and that said Letters Patent is hereby corrected as shown below:

On the Title Page

Item (73) Assignee:
Please correct the Assignee name as follows:
BULL SAS, Les Clayes-sous-Bois (FR)

Signed and Sealed this
Thirtieth Day of July, 2019

Andrei Iancu
*Director of the United States Patent and Trademark Office*